United States Patent [19]

Feldpausch

[11] Patent Number: 4,948,614

[45] Date of Patent: Aug. 14, 1990

[54] FROZEN NON-DAIRY DESSERT

[76] Inventor: David Feldpausch, 737-11 Woodside La. East, Sacramento, Calif. 95825

[21] Appl. No.: 297,036

[22] Filed: Jan. 17, 1989

[51] Int. Cl.$^5$ .............................................. A23G 9/02
[52] U.S. Cl. ..................................... 426/565; 426/249; 426/519; 426/524; 426/615
[58] Field of Search ............... 426/565, 615, 639, 249, 426/524

[56] References Cited

U.S. PATENT DOCUMENTS

| | | | |
|---|---|---|---|
| 2,548,865 | 4/1951 | Burt | 426/567 |
| 3,535,122 | 10/1970 | Musselwhite et al. | 426/565 |
| 4,335,155 | 6/1982 | Blake et al. | 426/639 |
| 4,368,211 | 1/1983 | Blake et al. | 426/565 |
| 4,510,166 | 4/1985 | Lenchin | 426/565 |
| 4,609,561 | 9/1986 | Wade et al. | 426/557 |
| 4,675,195 | 6/1987 | Holton | 426/639 |

*Primary Examiner*—R. B. Penland
*Attorney, Agent, or Firm*—Mark C. Jacobs

[57] ABSTRACT

A frozen-nondairy dessert having the creamy texture and the mouth feel of an ice cream product comprised of quick frozen preferably ripe banana, which banana or banana mixture has been quick frozen preferably in small mass units and maintained in a frozen state till time of use. The frozen banana composite is first masticated, then whipped to achieve a significant overrun and either served immediately, or refrozen, preferably quickly for future use.

Other fruits, nuts, and flavorings may be added to the banana composite prior to the freezing step or can be mixed with frozen banana or composite during mastication or aeration.

16 Claims, 1 Drawing Sheet

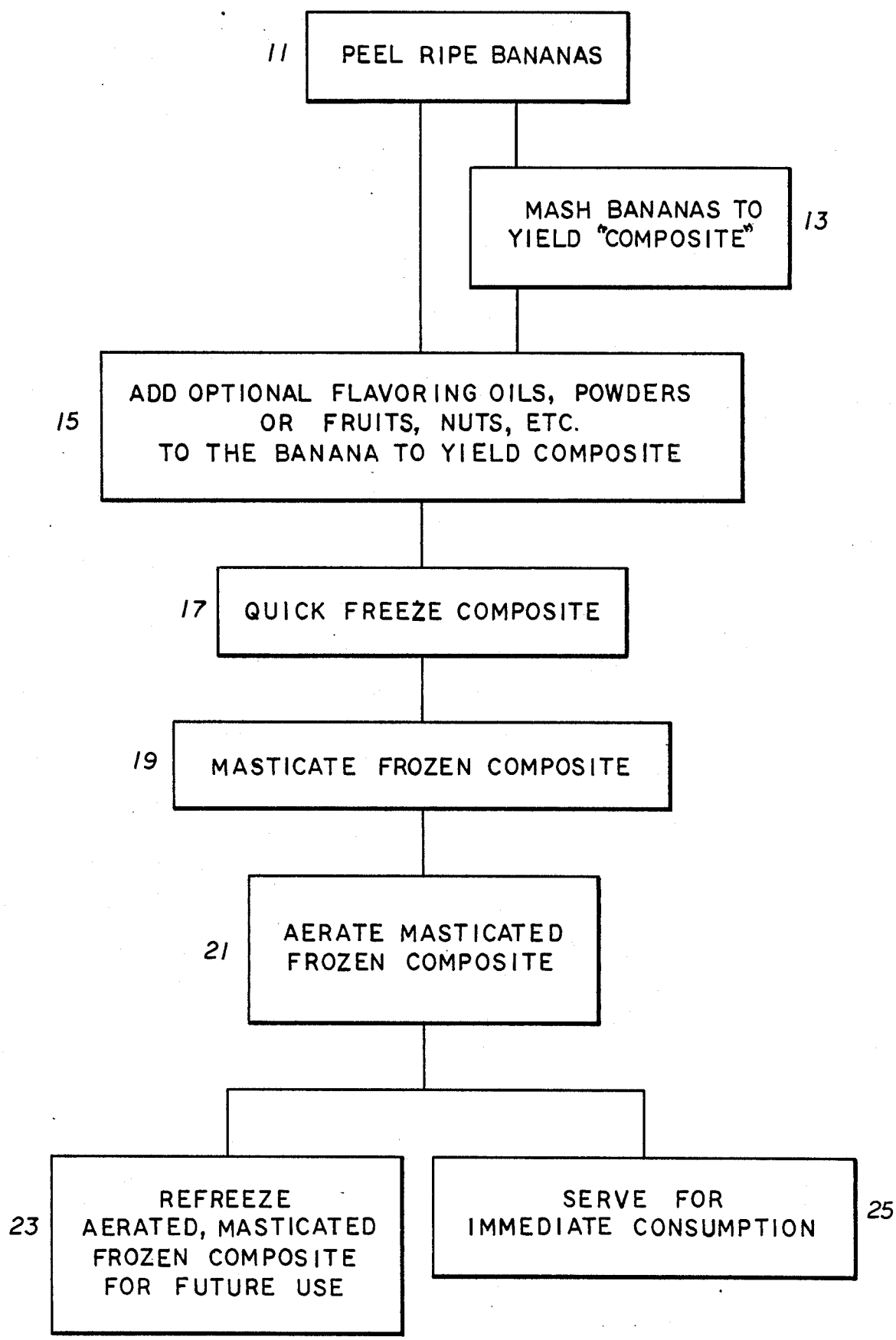

FROZEN NON-DAIRY DESSERT

BACKGROUND OF THE INVENTION

Today's population is becoming more and more health and health food conscious. Witness the continuing ban on cigarette smoking and the increase of availability of organically grown foods. More and more Americans are desirous of cutting down on their intake of preservatives and food additives. In addition there is a segment of the population that is attempting to reduce its intake of fats and cholesterol. There is also a segment of the population that needs to exclude dairy products from its diet due to allergy. For these people and others there is a need for healthful desserts, that allows them to exclude the above named non-desired products from their diets.

It is an object therefore of this invention to provide a non-dairy based dessert that utilizes as its base ingredient frozen preferably ripe bananas.

It is another object of this invention to provide a frozen dessert that can be made without the addition of food additives and preservatives.

It is yet another object to provide a frozen dessert that can be made substantially fat free.

This and other objects of the invention will in part be obvious and will in part appear hereinafter.

The invention accordingly comprises the product possessing the features, properties and the relation of components and the process involving the several steps in relation and order of one or more of such steps with respect each of the others all of which are exemplified in the following detailed disclosure and the scope of the application of which will be indicated in the claims.

For a fuller understanding of the nature and objects of the invention reference should be made to the following detailed description taken in conjunction with the accompanying drawing.

BRIEF DESCRIPTION OF THE FIGURES

The FIGURE is a block diagram illustrating the manufacture of the frozen dessert of this invention.

SUMMARY OF THE INVENTION

A non-dairy frozen dessert comprised of quick frozen banana composite which has been masticated and whipped to achieve a significant overrun. Banana may be used alone or in combination with other flavoring agents such as fruits, nuts as well as liquids such as vanilla extract, oils such as mint and powders or liquors such as chocolate and carob; all of which are added primarily prior to the freezing step to form what is designated a composite, or can be mixed with frozen banana during mastication or aeration.

DESCRIPTION OF THE PREFERRED EMBODIMENT

The present invention relates to a non-dairy frozen confection which has properties such as taste and mouth feel similar to soft serve ice cream, frozen yogurt and Dole Whip TM.

My invention differs from all of these products which start with a liquid which is a mixture of some or all of the following; dairy products, water, fruit concentrates, sugar, emulsifiers, stabilizers, colors, and fats derived from vegetable, and/or animal sources. This liquid is cooled and frozen while being whipped. The whipping action is what gives the products its overrun which is the entrainment of air therein. The percent of overrun is an expression of the amount of air that is frozen in said dessert. My invention involves the steps of using whole ripe fruits namely bananas singularly or mixed with other fruits, nuts, oils or powders or liquors at room temperature and the "quick freezing" of that mass; (b) then storing the frozen composite in a conventional freezer at around 0 degrees F. to $-15$ degrees F., and when the frozen composite is either ready to be consumed or repackaged, first masticating and then whipping the composite into a mass to give desired overrun qualities. If the mass is to be repackaged for later consumption it is again quick frozen and stored in a conventional freezer.

In order to obtain the optimum dessert, care should be exerted in the selection of the bananas to be employed for the base of this dessert. Properly chosen bananas have just the right amount of starch, carbohydrates, cellulose, pulp and pectin to work best in this process. Thus the bananas should be stored such as to avoid extreme heat and cold. When bananas approach their freezing point, the skin turns brown and more importantly the starch therein will not effectively turn to sugar. Permitting the banana's starch content to break down into sugars (glucose, fructose and sucrose) is of utmost importance to maximize flavor. Thus it has been noted that when the banana skin is yellow green, 40% of the carbohydrates are in the form of starch while after ripening, only 8% are still starch, the rest having broken down into natural sugars. It is important also not to try to obtain the last bit of starch to conversion, since bananas left too long will have their sugar content start to ferment.

In view of the high natural sugar content, and the presence of the banana pulp, there is little or no need for added sugar for either sweetening or for thickening purposes. The relative smoothness of the prepared pulp closely approximates the mouth feel that is obtained from the addition of fats, such as butter fat and emulsifiers and stabilizers to frozen desserts. Brown colored small spots on a yellow skin is a good colorimetric indicator of adequate ripening for use in the process of this invention. Almost any variety of banana may be employed herein other than plantains and related varieties whose starch does not turn to sugar and which upon ripening assume a consistency of potatoes, i.e. relatively hard.

The importance of the quick freezing of the fruit composite is three fold and cannot be overlooked. First, quick freezing allows for an extremely creamy texture with the absence of any perceived ice crystals when the product is being eater. Secondly quick freezing also improves shelf life, flavor and color. Thirdly quick freezing increases overrun.

When fruit is frozen in traditional modes, slowly which can take anywhere from one (1) to six (6) hours, the water contained in said fruit has ample time to form large ice crystals. These crystals burst the very delicate cellular walls which carry the integrity of the fruit's characteristics. Also when these cell walls are destroyed it hastens the action of polyphenoloxidase, which is an enzyme which causes oxidation of the fruit, turning it brown and disturbing its flavor. Quick freezing on the other hand, does not allow time for the water to form large crystals, thus preserving the cellular walls and holding the integrity of the fruit's characteristics. The effect of quick freezing upon the enzyme polyphenoloxidase is to almost completely eliminate its enzymatic action, while the composite is frozen, and greatly slows it down while the product is being consumed While any hastening of normal freezing time will improve the product, the desired goal to achieve the optimum product is less than 10 to 15 minutes This is obtainable by freezing the banana or banana mixture in small quantities about the size of oversized ice cubes or smaller. The temperature to store frozen composite should be between 0 degrees and −15 degrees F. in order to quench all of the enzymatic action discussed above.

One should understand that freezing is not to be considered the addition of cold, but rather the removal of heat. The removal of heat is facilitated by the enlargement of the surface area of the material to be frozen and reducing its mass. Thus it is recommended that the banana composite be cut into small segments of up to about 2' long to maximize the surface area and reduce its mass in order to achieve quick freezing by whatever method is chosen, immersion, spraying or mere placement on freezer plates.

Mashing of the banana, especially when it is to be united with other materials of a liquid or powder nature is recommended. This eases the incorporation of the other ingredients, and permits placement of uniform amounts into little molds such as ice cube trays adapted for the plate freezing technique.

HARDWARE AND PROCEDURE

The frozen dessert of this invention requires essentially two procedural steps. The first piece of hardware is one having a series of rotating blades to masticate the frozen composite. The term composite is utilized to refer either to the banana alone or to the mixture thereof with fruits, nuts, oils and the like as previously discussed. Thus, frozen composite refers to the composite after freezing.

The mastication blades chew up the frozen composite into a dense custard like pulp, designated the mix. The second piece of hardware acts to whip the mix to a state of homogeneity; and to entrain the desired amount of air to achieve a frozen dessert product of the desired taste and consistency. Overrun, the act of entraining air in the mix, can range from 30 to 100 percent with about a 60% increase in volume be the most preferable.

The two steps to prepare the final dessert from the frozen composite can take place in two different pieces of hardware or in one as may be desired.

While there are many suitable devices in the market place that can carry out the two main steps involved herein, I have found that particularly satisfactory mastication can take place with the Champion Juicer made by Plastaket Manufacturing Co, Inc. of Lodi, Calif. Various electric mixers having beater attachments such as made by Sunbeam, Hamilton Beach and others can be used to entrain the air to achieve the desired overrun level.

The reader's attention is now turned to the Figure. Invention 10 is seen to comprise a plurality of steps, all of which are described in detail within the confines of this application. First the operator should PEEL RIPE BANANAS, 11. The second step is to take the peeled bananas and preferably then MASH BANANAS TO YIELD COMPOSITE, 13. The word composite is merely used as a term of reference to differentiate the mash from the whole banana. While mashing has been suggested to render the incorporation of other fruits and nuts as well as flavors such as peppermint oil, powders such as cocoa and carob easier, such mashing is not a necessity prior to the incorporation since adequate mixing during the next incorporation step will yield a homogeneous product ready for freezing.

A further benefit of mashing banana used alone is that in the freezing step, the next step, uniform amounts can be put into containers such as ice cube trays if the banana is mashed rather than left in 1 inch or 2 inch segments.

After the suggested mashing, one then takes the step to ADD OPTIONAL OIL, POWDERS, FRUITS OR NUTS 15. After this incorporation, the operator uses any of the procedures discussed to QUICK FREEZE COMPOSITE 17. The frozen composite can be stored for several months if desired or used to prepare end product the same day according to the operator's desires.

The next step is to masticate, ie.-form a heavy pudding-like mass from the larger frozen sample. Thus the operator is directed to MASTICATE FROZEN COMPOSITE 19. This is followed by the aeration step, which requires one to AERATE MASTICATED FROZEN COMPOSITE 21 to achieve a significant overrun.

One may now either REFREEZE A.M.F.C. FOR FUTURE USE 23, or if desired SERVE FOR IMMEDIATE CONSUMPTION, 25.

The following non-limiting examples are to viewed as exemplary of the process of this invention. Examples 1–6 illustrate the blending of other ingredients with the banana base to make the various frozen composites.

EXAMPLE 1 All BANANA

Let bananas of good quality ripen undisturbed until; most of the starch has turned to sugar. Then peel ripe bananas either mash the pulp or leave the banana whole while maximizing surface area and minimizing mass. The banana is put through the quick freeze process with target freezing time of less than 10 to 15 minutes. The frozen pulp is then stored in regular freezer at a temperature of around 0° F. to −15° F., after being wrapped in plastic to protect the pulp from the ambient air which carry both moisture and contaminants. When needed, the frozen composite is masticated, homogenized and whipped to a target overrun of preferably about 60%, or to desired taste and consistency. The product can now be consumed or quick frozen again to be consumed later.

EXAMPLE 2 STRAWBERRY-BANANA

The procedure for using ripe bananas is the same as in Example 1. Strawberries are cleaned and cut into smaller pieces and blended with peeled ripe bananas. This composite is then poured into suitable molds then quick frozen followed by storage in a regular freezer prior to ultimate processing.

The proportion of strawberry to banana is defined only by individual taste. Using 8 ounces of banana as a constant and adding progressively more grams of strawberry up to 64 grams gives a progressively more strawberry flavor and color. At 64 grams a nice red color and clearly strawberry flavor is achieved. Although the strength of both the flavor and color is enhanced after 64 grams it is not as dramatic as before. In taste tests it was found that at 112 grams the flavor starts to become too tangy and not as pleasant as before at smaller proportions. 64 to 96 grams seemed to be the most popular.

EXAMPLE 3 BANANA AND PINEAPPLE

The procedure and proportions are almost identical to strawberry except that the color remained constant.

EXAMPLE 4 BANANA AND PECANS

The procedure for using ripe bananas is the same as mentioned earlier. It is important to note that the nuts to be used must be fresh. If they have started to turn rancid, beside the obvious taste consideration, the rancidity will accelerate the oxidation of the frozen composite. Pecans should be slightly chopped to ensure a more uniform mixture. When I used 8 ounces of banana as a constant and added more and more grams of pecan, the pecan flavor became more and more prominent up to the 14 gram point, at which it begins to overtake the banana flavor. As the amount of pecans increases the flavor becomes more and more intense. At 24 grams the banana influence appears lost. In taste tests around 18 to 24 grams of pecans per 8 ounces of banana was the most popular.

EXAMPLE 5 BANANA AND CHOCOLATE

Pure chocolate liquor was used. Using 8 ounces of banana as a constant, I added more and more chocolate in ½ gram increments. In taste tests, the preference was for between 5 and 7 grams. At 8 grams the cocoa flavor started to become to strong.

EXAMPLE 6 BANANA AND PEPPERMINT

Non-alcoholic natural peppermint flavor was used. 8 ounces of banana was again used as a constant and drops of flavor were added. Anything over 4 drops were too strong. The preferred formula utilized between 2 and 3 drops per 8 ounces of banana.

The following example pertain to the use of various machines to entrain air, ie obtain overrun. The overrun with any one machine is seen to be increased when the quick freeze method of this invention is employed.

EXAMPLE 7

A plurality of 4 oz. increments of unmasticated banana were placed in ice cube trays and frozen using both the quick freeze and conventional freezing methods described elsewhere herein. Uniform 4 oz. samples from the batches of QF and CF prepared banana were measured to determine their volume which formed a K factor. The original volume was designated as 100%. After treatment the volumes were remeasured to determine the new volume.

a. Two four ounce supply of cubes were placed in Champion Juicer and forced through the machine.

| Conventional Freezer | 127% overrun |
| Quick Freeze | 136% overrun | b. A second pair of 4 ounce samples were treated by a proprietary chopper aeration device.

| Conventional Freezer | 134.5% overrun |
| Quick Freeze | 149% overrun | c. Two 4 ounce cube samples were run through a manually operated cheese grater and then beaten with a hand held electric mixer.

| Conventional Freezer | 111% overrun |
| Quick Freeze | 127% overrun | d. Two 4 ounce samples were forced through a hand operated meat grinder, used normally to prepare hamburger.

| Conventional Freezer | 109% overrun |
| Quick Freeze | 113% overrun* |

*13% increase over the original 100%.

e. When a Vita-Mix blender and an off the shelf household blender were each used, it was found that neither was operative to provide overrun, due to the necessity to add water to solids to beat them up. The addition of water dilutes the fruit and is contrary to the procedure of this invention.

The following examples illustrate the preparation of frozen desserts according to this invention.

EXAMPLE 8 STRAWBERRY - BANANA

Approximately 8 ounces of ripe peeled banana were blended with 64 grams of fresh sliced strawberries in a large glass bowl by mashing the banana and stirring it with the strawberries. The mixture was spooned into several empty openings in a plastic ice cube tray and then covered with plastic and flash frozen by immersing the tray into a tank of liquid nitrogen. After 6 minutes the tray was removed and the cubed composite was found to be frozen solid and stored at −5° F.

The following day the frozen composite was then subjected to mastication procedure and whipped to entrain air. The increase in volume was found to be 60%, i.e. an overrun of 160%. The product, which was dark pink in color was spooned onto a plate and served immediately.

EXAMPLE 9 BANANA

Sixteen ounces of mashed ripe banana were mashed and was spooned into a plastic ice cube tray and frozen in the manner recited in Example 8. After quick freezing the tray it was removed from the nitrogen tank, and stored in a conventional home freezer for future use.

About two weeks later, 8 ounces of the frozen composite were masticated in a customized Champion Juicer and whipped with an electric mixer to an overrun of about 160% and then served. The balance of the frozen composite was returned to the home freezer in the zip lock bag.

EXAMPLE 10 BANANA

Eight ounces of ripe banana sections were placed in liquid nitrogen and allowed to solidify. After 6 minutes, the frozen composite was removed, and stored at −5° F. for one day and then masticated by a cheese grater and then whipped using a hand held electric mixer. Overrun was believed to be about 127%. The frozen dessert had a smooth frozen yogurt like mouth feel.

It is seen that I have provided an improved frozen dessert that utilizes no added fat or additives. Though if desired, a minor amount of an anti-oxidant from the GRAS list can be added to the straw colored products, such as all banana or pineapple banana to prevent browning due to oxidation. When strawberries, blueberries and the like are added, the need for anti-oxidants is lessened, as the color is provided by the additional ingredient.

The frozen composite of this invention can be stored for several months prior to the preparation of the ultimate dessert, thereby allowing the homeowner to prepare large portions at one time for future use.

Since certain changes can be made in the above product without departing from the scope of the invention, it is intended that all matter contained in the above description shall be interpreted as illustrative and not in a limiting sense.

I claim:

1. The process of making a frozen dessert which consists essentially of the steps of:
   a. peeling at least one ripe banana;
   b. quick freezing the ripe banana(s);
   c. masticating the frozen banana(s) to form a pudding;
   d. aerating the masticated frozen banana(s) to entrain air and achieve a significant overrun.

2. The process as in claim 1 including the step of mashing the banana(s) after peeling and before freezing.

3. The process of claim 2 including the step of adding at least one member selected from the group consisting of edible flavoring oils, powders, fruits and nuts to the banana before the freezing step.

4. The process of claim 3 plus the additional step of quick refreezing the aerated masticated frozen composite.

5. The process of claim 3 wherein the member added is strawberries.

6. The process of claim 3 wherein the member added is cocoa.

7. The process of claim 3 wherein the mastication and the aeration of the frozen composite take place substantially simultaneously in the same machine.

8. The process of claim 1 plus the additional step of quick refreezing the aerated masticated frozen composite.

9. The process of claim 8 wherein the freezing step takes place within about 15 minutes.

10. The process of claim 1 wherein the quick freezing is carried out by immersing the banana into liquid nitrogen.

11. The process of claim 1 wherein the mastication and the aeration of the frozen composite take place substantially simultaneously in the same machine.

12. The process of claim 1 wherein the freezing of the banana(s) takes place within about 15 minutes.

13. The process for making a frozen dessert from peeled quick frozen ripe bananas, which consists essentially of masticating the frozen banana(s) to form a pudding; and aerating the masticated banana(s) to entrain air and achieve a significant overrun.

14. The process of claim 13 including the step of adding at least one member selected from the group consisting of edible flavoring oils, flavouring powders, fruits and nuts to the banana(s) prior to freezing.

15. The processing of claim 13 wherein the mastication step and the aeration step take place substantially simultaneously in the same machine.

16. The process of claim 13 including the additional step of refreezing the aerated masticated frozen banana mass.

* * * * *